US008128473B2

(12) United States Patent
Finnochio

(10) Patent No.: US 8,128,473 B2
(45) Date of Patent: Mar. 6, 2012

(54) METHOD OF PLAYING A GAME OF CHANCE COMBINING NUMBER AND SYMBOL MATCHING AND SYSTEM FOR FACILITATING THE PLAY THEREOF

(75) Inventor: Richard Finnochio, Everett, MA (US)

(73) Assignee: GTech Rhode Island Corporation, Providence, RI (US)

( * ) Notice: Subject to any disclaimer, the term of this patent is extended or adjusted under 35 U.S.C. 154(b) by 446 days.

(21) Appl. No.: 10/410,130

(22) Filed: Apr. 9, 2003

(65) Prior Publication Data

US 2004/0204224 A1 Oct. 14, 2004

(51) Int. Cl.
*G06F 9/24* (2006.01)

(52) U.S. Cl. ................. 463/16; 463/19; 463/20; 463/18

(58) Field of Classification Search .......... 463/1, 16–29, 463/40–43, 46; 273/236, 138.1, 138.2, 139, 273/144 R, 144 A, 144 B, 292, 293, 148 R, 273/303–307, 149 R, 149 P
See application file for complete search history.

(56) References Cited

U.S. PATENT DOCUMENTS

| | | | | | |
|---|---|---|---|---|---|
| 4,441,714 | A | * | 4/1984 | Goott | 273/144 B |
| 5,100,139 | A | * | 3/1992 | Di Bella | 273/292 |
| 5,407,199 | A | | 4/1995 | Gumina | |
| 5,564,701 | A | * | 10/1996 | Dettor | 463/16 |
| 5,996,997 | A | * | 12/1999 | Kamille | 273/139 |
| 6,168,521 | B1 | * | 1/2001 | Luciano et al. | 463/18 |
| 6,224,055 | B1 | | 5/2001 | Walker et al. | |
| 6,250,685 | B1 | | 6/2001 | Walker et al. | |
| 6,368,214 | B1 | * | 4/2002 | Luciano | 463/18 |
| 6,409,173 | B1 | * | 6/2002 | Tri | 273/292 |
| 6,435,500 | B2 | | 8/2002 | Gumina | |
| 6,722,655 | B1 | * | 4/2004 | Camero | 273/269 |
| 6,878,061 | B2 | * | 4/2005 | Baerlocher et al. | 463/16 |
| 7,118,476 | B1 | * | 10/2006 | White et al. | 463/17 |
| 2007/0082725 | A1 | * | 4/2007 | Low et al. | 463/16 |
| 2008/0254881 | A1 | * | 10/2008 | Lutnick et al. | 463/31 |
| 2010/0124967 | A1 | * | 5/2010 | Lutnick et al. | 463/17 |
| 2011/0009180 | A1 | * | 1/2011 | Luciano et al. | 463/19 |
| 2011/0065490 | A1 | * | 3/2011 | Lutnick | 463/16 |

* cited by examiner

*Primary Examiner* — Pierre E Elisca

(74) *Attorney, Agent, or Firm* — Sullivan & Worcester LLP; Christopher T. McWhinney

(57) ABSTRACT

A method for playing a game of chance and system for facilitating the play of the game are disclosed. The method of playing the game of chance includes choosing a selected symbol. The method of playing the game of chance further includes choosing a set of selected numbers. The method of playing the game further includes receiving a prize if a predetermined number the selected symbols matches the drawn symbol for each selected number.

20 Claims, 11 Drawing Sheets

900

920 940

910

| | Match | Prizes For $1 Chance | | | | | | | | | |
|---|---|---|---|---|---|---|---|---|---|---|---|
| Spot | | 10 | 9 | 8 | 7 | 6 | 5 | 4 | 3 | 2 | 1 |
| | 10 | 20,000 | | | | | | | | | |
| | 9 | 2,000 | 10,000 | | | | | | | | |
| | 8 | 100 | 500 | 5,000 | | | | | | | |
| | 7 | 10 | 50 | 200 | 2,000 | | | | | | |
| | 6 | 5 | 8 | 20 | 60 | 200 | | | | | |
| | 5 | 2 | 3 | 5 | 5 | 18 | 100 | | | | |
| | 4 | 1 | 1 | 3 | 3 | 5 | 6 | 64 | | | |
| | 3 | | | | 1 | 1 | 2 | 3 | 3 | | |
| | 2 | | | | | | | 1 | 1 | 3.50 | |
| | 1 | | | | | | | | | 1.00 | 2.50 |
| | 0 | 2 | 2 | 1 | 1 | 1 | 1 | | 1 | | |

Figure 9

1000

| | | | | | |
|---|---|---|---|---|---|
| 123456 | 1979621 | 11/01/02 14:42 | 20$ | UNREDEEMED | 1010 |
| 123457 | 1979621 | 11/01/02 14:45 | 2$ | UNREDEEMED | 1010 |
| 123458 | 1979621 | 11/01/02 14:49 | 0$ | UNREDEEMED | 1010 |
| 123459 | 1979621 | 11/01/02 14:53 | 2$ | UNREDEEMED | 1010 |

Figure 10a

| 1060 | 1050 | 1040 | 1030 | 1020 | |
|---|---|---|---|---|---|
| 123458 | 1979621 | 1/10/02 3:56 | 20$ | UNREDEEMED | 1010 |

Figure 10b

METHOD OF PLAYING A GAME OF CHANCE COMBINING NUMBER AND SYMBOL MATCHING AND SYSTEM FOR FACILITATING THE PLAY THEREOF

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND INFORMATION

Some retail establishments, such as newsstands or delicatessens, may offer customers a chance to purchase a ticket in a traditional lottery game. In a traditional lottery game a ticket is purchased containing a set of numbers. These numbers may be selected by a customer or automatically selected at a customer's request. Subsequent to a ticket's purchase, a set of numbers are randomly drawn. The set of numbers on the ticket is matched with the set of drawn number to determine whether the ticket is a winning ticket.

Keno is similar to a traditional lottery game. However, Keno drawings occur more frequently than the traditional lottery drawings, once every 10 or 15 minutes, thus offering customers a more frequent opportunity to play than traditional lottery drawings. In playing Keno a customer may choose a set of selected numbers, e.g., 10 numbers between 1 and 80 may be selected. Alternatively, at a customer's request, these selected numbers may be chosen automatically. Like a traditional lottery game, subsequent to the tickets purchase a set of drawn numbers may be randomly drawn. The selected numbers may be matched to the set of drawn numbers to determine if the ticket is a winning ticket. Based on the number of selected numbers matched with the drawn numbers a customer may determine whether a ticket is a winning ticket. A winning ticket may be redeemed for a prize. In addition to allowing customers to win prizes based upon the number of selected numbers matched, Keno provides a source of entertainment. The selection of the draw numbers may be displayed, e.g., at 30 second intervals, to hold customer's attention over an extended period of time. Thus, retail establishments offering Keno may benefit from increased patronage or increased customer time spent at an establishment.

To play Keno a customer typically first fills out an entry form. On the entry form the customer may indicate the amount of numbers the customer wishes to play or the amount of spots, the amount the customer wishes to risk per game, and the number of games the customer wishes to play. Additionally, the customer may choose the selected numbers from a pool of numbers for the play of the game. The pool of numbers typically consists of the numbers 1 through 80. Once the form is complete the customer may present the form to a ticket supplier, e.g. a cashier or a vending machine, and the customer may receive a ticket.

Keno drawings are numbered or alternatively, may be identified by the time the drawing begins. A ticket may indicate the game number that the ticket is for. When the drawing occurs each number from the pool of numbers is typically initially displayed, usually the numbers 1 through 80. However, a set of drawn numbers is randomly selected from the pool of numbers on the display. This set of draw numbers may include 20 numbers.

One problem with Keno is that a customer may lose interest after a time. This may result from a customer's inability to win or a customer's growing accustomed to the same game being played time and time again. Additionally, in order to maintain interest Keno drawings need to be frequent.

BRIEF DESCRIPTION OF THE DRAWINGS

FIG. 9 illustrates an example game chart, according to an example embodiment of the present invention.

FIG. 10 illustrates an example ticket log for use in facilitating the play of a game of chance, according to an example embodiment of the present invention.

DETAILED DESCRIPTION OF EXAMPLE EMBODIMENTS

In an example embodiment of the present invention, a customer may purchase a ticket for a chance in a game. The ticket may include a set of selected numbers. The selected numbers on the ticket may be selected from a pool of numbers, e.g., by the customer or randomly when a ticket is purchased. When the game is played, a set of drawn numbers may be drawn from the pool of numbers, e.g., 20 numbers may be drawn. This game may be played by matching the selected numbers with the drawn numbers.

In addition to numbers, the game may also be played by matching symbols, e.g., playing card suits, colors, shapes, fruits, etc. The ticket may include a selected symbol(s) in addition to the selected numbers. The selected symbol(s) on the ticket may be selected from a group of symbols, e.g. by the customer or randomly drawn when a ticket is purchased. When the game is played, a drawn symbol may be drawn for each of the selected numbers. This game may be played by matching the selected symbols with the drawn symbols for each of the selected numbers. Based upon the number of symbols matched a customer may determine whether a ticket is a winning ticket.

For example, a ticket may include the selected symbol hearts and the selected numbers 5, 25, 15, 62, and 11. At some time after the ticket is purchased, a corresponding drawn symbol may be drawn for each of the selected numbers 5, 25, 15, 62 and 11. The selected symbol, in this case hearts, may be matched against the drawn symbol corresponding to the selected numbers 5, 25, 15, 62, and 11 to determine whether the ticket is a winning ticket.

Whether the ticket is a winning ticket may depend on the number of drawn symbols matched with the selected symbols. For example, matching 0 or 3 or more symbols may result in a winning ticket that may be redeemed for a prize. The amount of the prize may vary depending on the number of drawn symbols matched. Matching three out of five drawn symbols may result in a winning ticket with a value of $2 for every dollar wagered while matching four out of five drawn symbols may result in a winning ticket with a value of $6. It will be appreciated that the selected numbers represented on a ticket may be used to play a number matching game, such as Keno. Thus, a ticket may be able to provide chances in different games. One chance may be for a symbol matching game and a second chance may be for a number matching game such as Keno.

Example Ticket for Playing a Game of Chance

Figure 1:
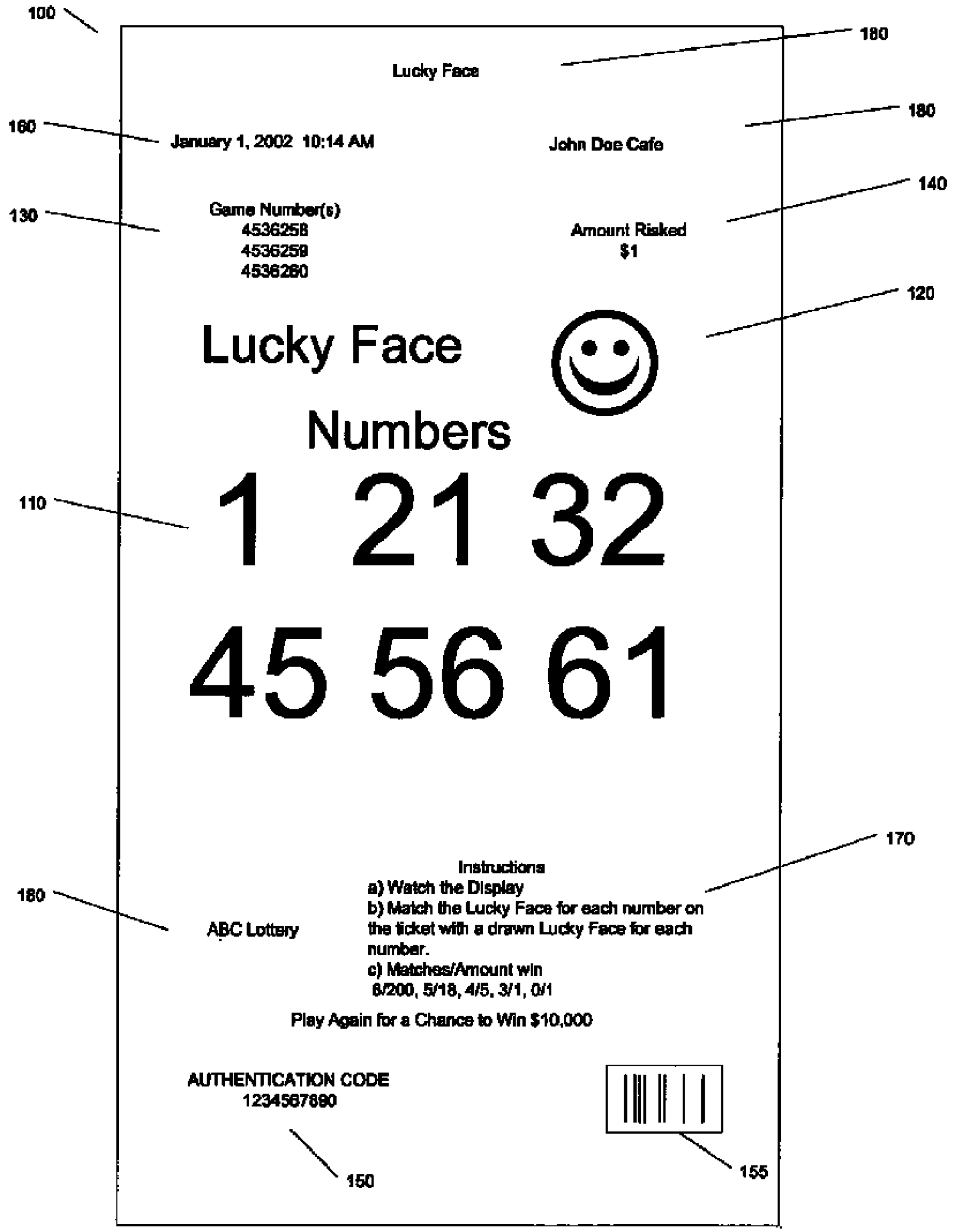
FIG. 1 illustrates an example ticket, according to an example embodiment of the invention.

FIG. 1 represents an example ticket, according to an example embodiment of the present invention. The example ticket may be received in a variety of way, e. g., by requesting a ticket from a cashier or establishment operator or by purchasing a ticket from a vending machine that generates such tickets. The example ticket may include a variety of information. For example, a ticket may include a set of selected numbers, a selected symbol, an authentication code, a time/date field, a drawing number field, game instructions, or an amount wagered field. It will be appreciated that a ticket may be received for a number of games of chance. Additionally, multiple chances may be purchased in a single game.

The example ticket 100 may be for a symbol matching game or for a number matching game or for both. The example ticket 100 may be printed on a substrate, e.g., a printable substrate such as paper, card stock, plastic, or various laminates. Additionally, it will be appreciated that the example ticket 100 may be electronic or depicted on a display screen. Information may be found on both sides of the example ticket 100.

The example ticket 100 may include a set of selected numbers 110. The selected numbers may be chosen from a pool of numbers. For example, the pool of numbers may be the whole numbers between 1 and 80. It will be appreciated that the numbers present in the pool of game play numbers may vary according to the rules of the game. The set of selected numbers 110 depicted on example ticket 100 are 1, 21, 32, 45, 56 and 61. The customer thus has six selected numbers on the example. The amount of selected numbers on a ticket is the spot number. Thus, the spot number for example ticket 100 would be six. It will be appreciated that the spot number may vary depending, for example, on the rules of the game. The selected numbers 110 may be used for the play of both a number matching game and a symbol matching game.

The example ticket 100 may also include a selected symbol 120. The selected symbol 120 represents the symbol to be matched with a set of drawn symbols. It will be appreciated that multiple selected symbols may be permitted. It will be appreciated that the pool of available symbols may be playing card suits, colors, shapes, fruits, etc. Each selected symbol 120 may be matched against a corresponding drawn symbol for each of the selected numbers 110.

Thus, each selected symbol 120 on a ticket may represent a chance in a game. The number of selected symbols matched enables a customer to determine whether a ticket is a winning ticket.

The example ticket may include a drawing identifier field 130. It will be appreciated that each time the set of drawn symbols are drawn it may be a separate game. The drawing identifier field 130 may represent the game number or the time of the drawing. The drawing identifier field 130 may indicate the game or games that the ticket has been purchased for. Typically, the game identifier field 130 may indicate that a ticket is for the next game available. However, it will be appreciated that the customer may be able to select the game or games to be played and that the customer may be able to use the same ticket for more than one game.

The example ticket may include an amount wagered field 140. The amount wagered 140 field may represent the amount wagered on each chance in a game. In will be appreciated that the amount wagered field 140 may alternatively indicate the total purchase price of the ticket.

The example ticket 100 may also include an authentication code 150. The authentication code 150 may uniquely identify the ticket. More digits may be provided for greater security. The authentication code 150 may include the information needed to authenticate the ticket when the ticket is redeemed. A machine-readable version of the authentication code 155 may also be located on the example ticket 100. The machine-readable version of the authentication code 155 may be a bar code, e.g., a stacked linear bar code or two-dimensional bar code. A standard I 2 of 5 or other standard bar code may be employed. It will be appreciated that other forms of machine-readable information may be included on the ticket, in place of the bar codes, e.g., magnetic strips or smart card capability. It will also be appreciated that the machine-readable code 155 may also include other information, e.g., a checking code that may provide sufficient information to identify whether the ticket is a winning ticket without providing sufficient information to authenticate the ticket. Such a checking code may be used at a checking station that may be provided to allow customers to test whether they have winning tickets.

The example ticket may include a time/date field 160. The time/date field may include the time/date the ticket was purchased. In the alternative the time/date field may include the time/date of the game.

The example ticket 100 may also include information not directly involved in the play of the game. Located on example ticket 100 may be instructions 170 for playing the game or for the use and/or redemption of the ticket. Additionally, the instructions 170 may include a chart indicating the prize received depending on the number of symbols matched. The example chart may indicate for each spot number the number of suits that must be matched for a ticket to be a winning ticket. Additionally, the chart may include the prize for each number selected symbols matched.

It will be appreciated that other information 180 may be included in the example ticket, e.g., the identity of the agent selling the ticket, an identification number for the point of sale terminal that the ticket was sold from, additional advertising information, coupons, etc. Rules of the game and/or legal disclaimers may be printed on the ticket, e.g., on the reverse side. Additional security and authentication information may also be added, e.g., multiple layer, special marks, etc.

Alternative Example Ticket for Playing a Game of Chance

Figure 2:
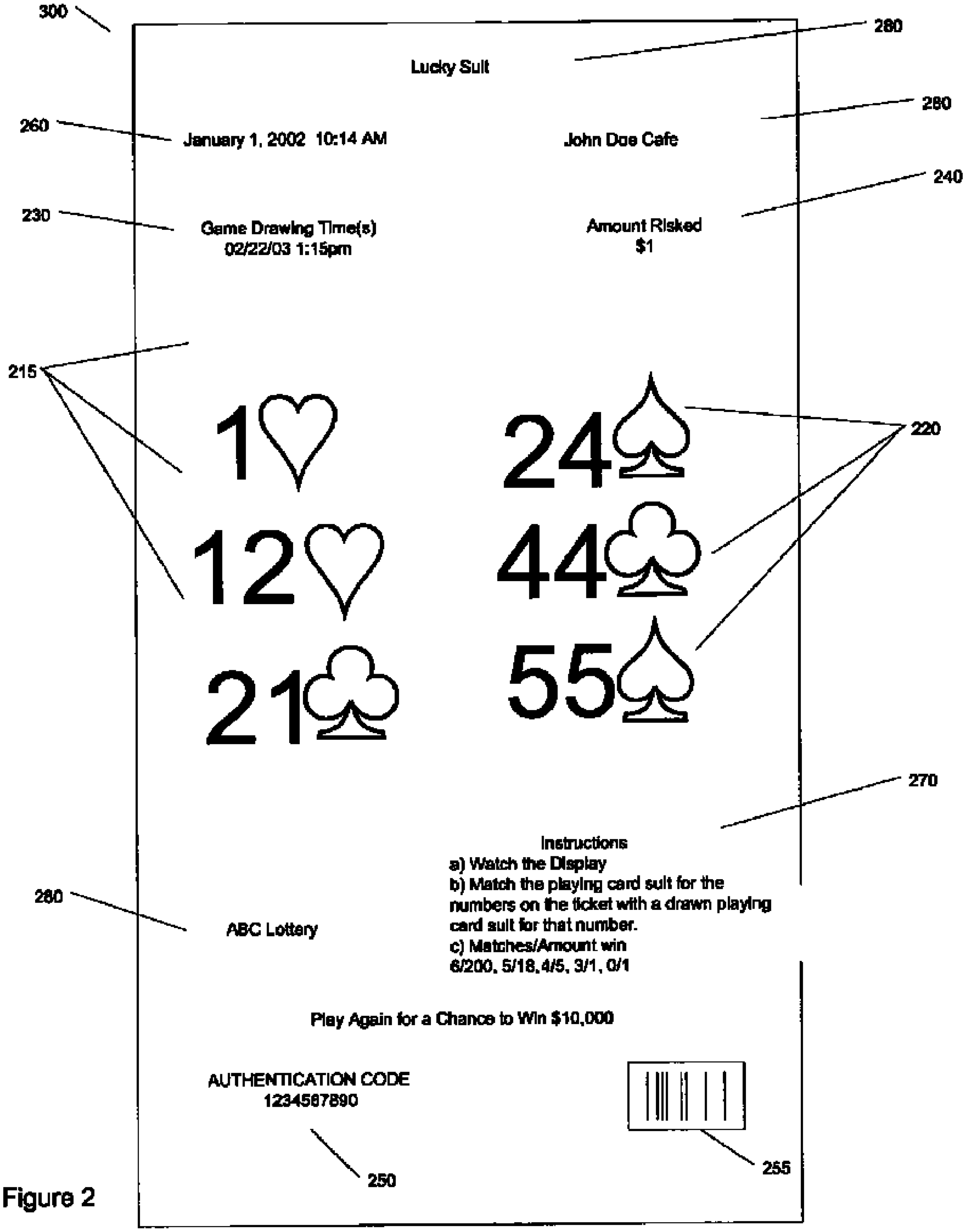
FIG. 2 illustrates a second example ticket, according to an example embodiment of the invention.

FIG. 2 represents a second example ticket according to an example embodiment of the present invention. The second example ticket 200 may be received in a variety of ways, e. g., by requesting a ticket from a cashier or establishment operator or by purchasing a ticket from a vending machine that generates such tickets. The second example ticket 200 may include a variety of information. For example, the second example ticket 200 may include a set of selected numbers, a selected symbol for each selected number, an authentication code, a time/date field, a drawing number field, game instructions, or an amount wagered field. It will be appreciated that a ticket may be received for a number of games of chance. Additionally, multiple chances may be purchased in a single game.

The second example ticket 200 may be for a symbol matching game or for a number matching game or for both. The second example ticket 200 may be printed on a substrate, e.g., a printable substrate such as paper, card stock, plastic, or various laminates. Additionally, it will be appreciated that the second example ticket 200 may be electronic or depicted on a display screen. Information may be found on both sides of the second example ticket 200.

The second example ticket 200 may include a set of selected numbers 215. The set of selected numbers 215 may be chosen from a pool of numbers. For example, the pool of numbers may be the whole numbers between 1 and 80. It will be appreciated that the numbers present in the pool of numbers may vary according to the rules of the game. The set of selected numbers 215 depicted on second example ticket 200 are 1, 12, 21, 24, 44 and 55. The customer thus has six selected numbers on the card. The spot number for this card would be six. The spot number is equal to the amount of selected numbers on a card. It will be appreciated that the spot number may vary depending, for example, on the rules of the game. The selected numbers 215 may be used for the play of both a symbol matching game and a number matching game.

The second example ticket 200 may include a selected symbol 220 corresponding to each selected number 215 on the ticket. The symbols illustrated on the second example ticket are playing card suits, although other symbols may be used. The selected symbol 220 represents the symbol to be matched with a drawn symbol during play of a game. The number of selected symbols matched enables a customer to determine whether a ticket is a winning ticket.

The example ticket may include a drawing identifier field 230. It will be appreciated that each time the set of drawn symbols are drawn it may be a separate game. The drawing identifier field 230 may represent the game number or the time of the drawing. The drawing identifier field 230 may indicate the game or games that the ticket is purchased for. Typically, the game identifier field 230 may indicate that a ticket is for the next game available. However, it will be appreciated that the customer may be able to select the game or games to be played and that the customer may be able to use the same ticket for more than one game.

The second example ticket 200 may include an amount wagered field 240. The amount wagered 240 field may represent the amount wagered on each chance in a game. In will be appreciated that the amount wagered field 240 may also indicate the total purchase price of the ticket.

The second example ticket 200 may also include an authentication code 250. The authentication code 250 may uniquely identify the ticket. More digits may be provided for greater security. The authentication code 250 may include the information needed to authenticate the ticket when the ticket is redeemed. A machine-readable version of the authentication code 255 may also be located on the second example ticket 200. The machine-readable version of the authentication code 255 may be a bar code, e.g., a stacked linear bar code or two-dimensional bar code. A standard I 2 of 5 or other standard bar code may be employed. It will be appreciated that other forms of machine-readable information may be included on the ticket, in place of the bar codes, e.g., magnetic strips or smart card capability. It will also be appreciated that the machine-readable code 255 may also include other information, e.g., a checking code that may provide sufficient information to identify whether the ticket is a winning ticket without providing sufficient information to authenticate the ticket. Such a checking code may be used at a checking station that may be provided to allow customers to test whether they have winning tickets. The second example ticket 200 may include a time/date field 260. The time/date field may include the time/date the ticket was purchased. In the alternative the time/date field may include the time/date of the game.

The second example ticket 200 may also include information not directly involved in the play of the game. Located on second example ticket 200 may be instructions 270 for playing the game or for the use and/or redemption of the ticket. Additionally, the instructions 270 may include a chart indicating the prize received depending on the number of symbols matched. The example chart may indicate for each spot number the number of suits that must be matched for a ticket to be a winning ticket. Additionally, the chart may include the prize for each number selected symbols matched.

It will be appreciated that other information 280 may be included on the second example ticket 200, e.g., the identity of the agent selling the ticket, an identification number for the point of sale terminal that the ticket was sold from, additional advertising information, coupons, etc. Rules of the game and/or legal disclaimers may be printed on the ticket, e.g., on the reverse side. Additional security and authentication information may also be added, e.g., multiple layer, special marks, etc.

Example Entry Form

Figure 3:
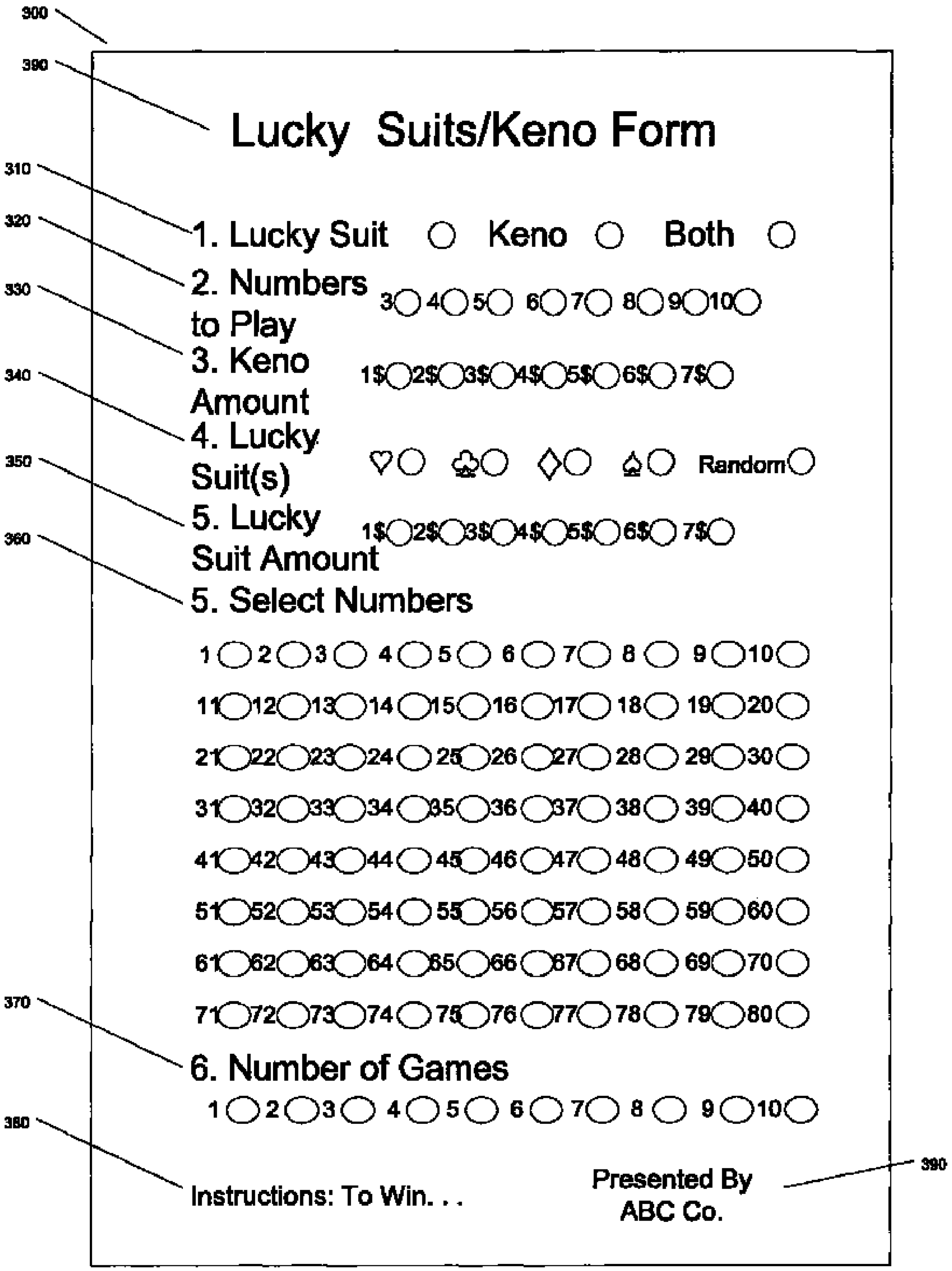
FIG. 3 illustrates an example entry form, according to an example embodiment of the invention.

FIG. 3 illustrates an example entry form for facilitating the playing of a game of chance, according to an example embodiment of the present invention. This entry form may be used to acquire a ticket for the play of a game of chance. The form may be offered at establishments offering a game of chance and distributed to customers who wish to play. The example entry form 300 may be for a symbol matching game, a number matching game, such as Keno, or both. The example entry form 300 may be located on a substrate, e.g., a printable substrate such as paper, card stock, plastic, or various laminates. Additionally, it will be appreciated that example entry form 300 may be electronic or depicted on a display. A customer may use an example entry form 300 to acquire a ticket. A customer may make indications on the form to indicate the customer's preferences. Information may be found on both sides of the example entry form 300. The example entry form 300 and indications marked on the form may be machine readable such that a machine could generate a ticket using the example entry form 300.

Located on the example entry form 300 may be a game play field 310. The game play field 310 may be used to indicate the game that a customer wishes to play. For example, in FIG. 3 the example entry form 300 may be used for the play of a symbol matching game, Lucky Suit, a number matching game, Keno, or both games as indicated in game play field 310. A customer may thus use the games play field 310 to indicate whether he/she would like to play Lucky Suit, Keno or both. A customer may place an indication mark in the space provided next to each term in order to indicate the customer's preference.

Located on the example entry form 300 may be a spot field 320. The spot field 320 may be used to indicate the amount of selected numbers a customer would like placed on a ticket. For example, in FIG. 3 a player wishing to play the symbol matching game may have the option of selecting 3, 4, 5, 6, 7, 8, 9 or 10 numbers in the spot field 320. It will be appreciated that the options in the spot field 320 may be increased or decreased. A customer may place an indication mark in the space provided next to a selection to indicate the amount of selected numbers a customer would like to choose. Located on the example entry form 300 may be a Keno amount field 330. The Keno amount field 330 may be used by a customer wishing to play Keno to indicate the amount of money that the customer would like to risk on a chance in that game. For example, in FIG. 3 a player wishing to play Keno may risk either $1, $2, $3, $4, $5, $6, $7, or $8 per chance. It will be appreciated that the amounts listed in the Keno amount field may vary.

Located on the example entry form 300 may be a select symbol field 340. The select symbol field 340 may be used by a customer to indicate a symbol that the customer would like to match in a symbol matching game. It will be appreciated that on the example entry form 300 a customer may select between 1 and 4 symbols to be matched. The number of selections available in the select symbol field 340 may vary depending on the rules of the game. The random selection in the select symbol field 340 may be used by a customer to indicate that a symbol should be randomly selected for each selected number. It will also be appreciated that for each selected number a customer may be able to select a separate selected symbol.

Located on the example entry form 300 may be a symbol amount field 350. The symbol amount field 350 may be used by a customer wishing to play the symbol matching game to indicate the amount of money that the customer would like to risk on a chance in the game. For example, in FIG. 3 a player wishing to play the symbol matching game in the symbol amount field 160 may risk either $1, $2, $3, $4, $5, $6, $7, or $8 per chance. It will be appreciated that the amounts listed in the symbol amount field 160 may vary.

Located on the example entry form 300 may be a select number field 360. The select number field 360 may be used by the customer to select the selected numbers to be used for the play of a game. As indicated above, the amount of numbers that may be selected in the select number field 360 may be indicated in the spot field 320. For example, if the amount selected in the spot field 320 is the number 5 then a customer may select 5 numbers from the select number field 360. It will be appreciated that a customer may have the 5 selected numbers chosen randomly by the system.

Located on the example entry form 300 may be a quantity of games field 370. The quantity of games field 370 may be used by the customer to select the number of games that the customer would like to play.

The example entry form 300 may include information not directly involved in the play of a game. Located on the example entry form 300 may be instructions 380 for playing the game or for the use of the example entry form 300. Additionally, the instructions 380 may include a chart indicating the prize received depending on the number of symbols matched. The example chart may indicate for each spot number the number of symbols that must be matched for a ticket to be a winning ticket. Additionally, the chart may include the prize for each number of symbols matched.

It will be appreciated that other information 390 may be included in the example entry form 300, e.g., the identity of the agent providing the entry form, an identification number for the point of sale terminal that the entry form was received from, additional advertising information, coupons, etc. Rules of the game and/or legal disclaimers may be printed on the entry, e.g., on the reverse side. Additional security and authentication information may also be added, e.g., multiple layer, special marks, etc.

Example Procedure for Playing a Game of Chance

Figure 4:
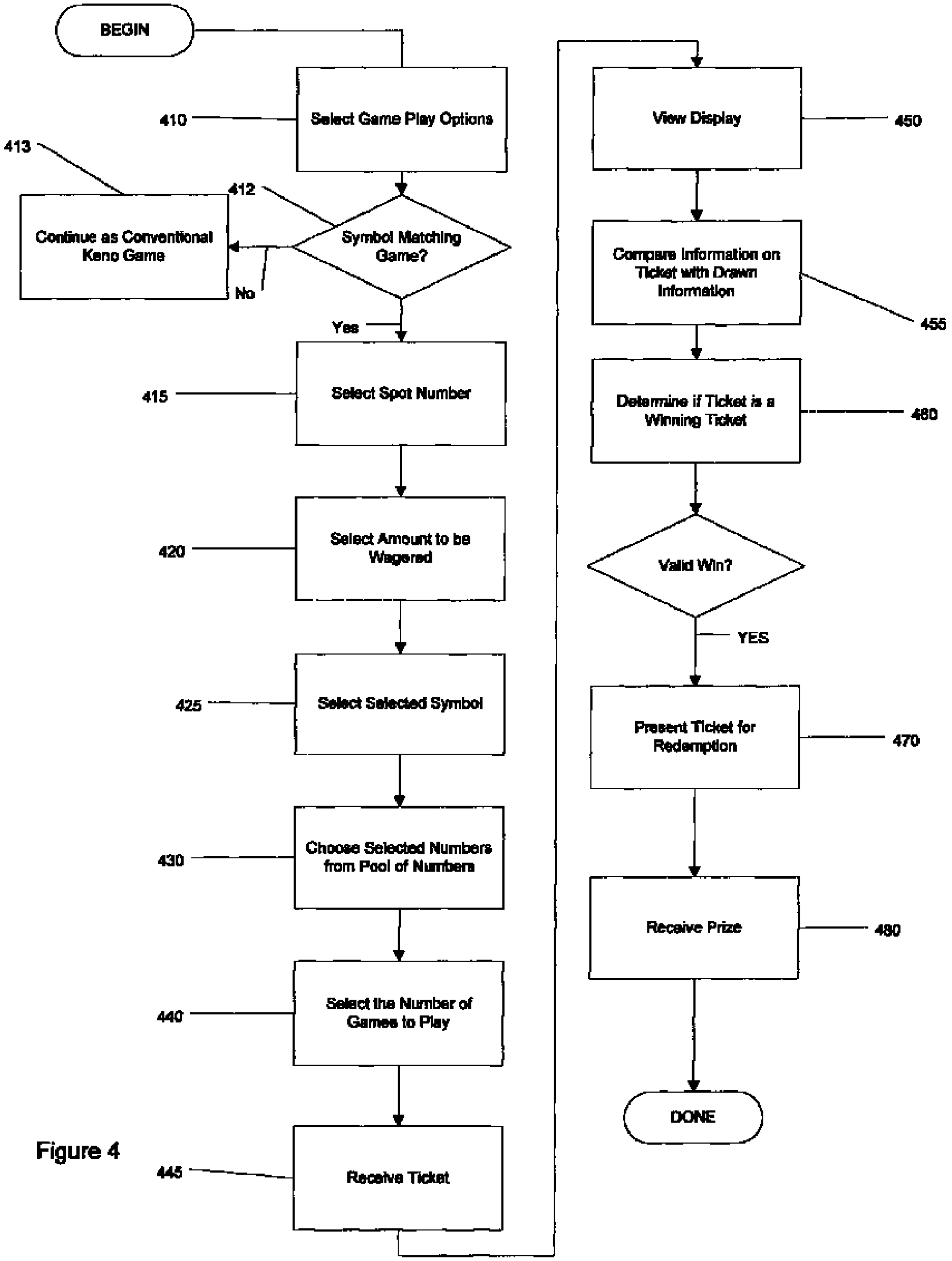
FIG. 4 illustrates an example procedure for playing a game of chance, according to an example embodiment of the present invention.

FIG. 4 illustrates an example procedure for playing a game of chance, according to an example embodiment of the present invention. In 410, a customer selects a game play option. A game play option may be selected by marking an entry form, entering information on a machine or computer, or telling a clerk who may enter information for a customer. Game play options may include a game based upon the matching of symbols, a game based on the matching of numbers or both. It will be appreciated that other games may also be included in the game play options. For the rest of the procedure it will be assumed that a customer has selected to play the game based upon the matching of symbols. If a customer selects to play a number matching game, the example procedure continues in 413 as a conventional Keno game, otherwise the procedure for playing the game continues in 415.

In 415, the customer may select the spot number (the amount of selected numbers that are to be chosen). For example, if a customer selects the quantity 4 as the spot number then the customer may choose 4 selected numbers. It will be appreciated that the quantity that may a the spot numbers may vary depending on, inter alia, the rules of the game In 420, a customer may select the amount to be wagered. In this step a customer may get to select the dollar amount that is to be wagered for each chance in a game. A chance represents a single chance to win. If a customer selects two separate game play options, such as the symbols matching game and the number matching game, then for each game played the customer would have two separate chances at winning. A customer may have the option of selecting different dollar amount to be wagered for each game play option. For example, if a customer selects a symbol matching game and a number matching game as game play options then the customer may have the option of selecting a different amount to be wagered for the symbol matching game and the number matching game.

In 425, a customer may select a selected symbol from a predefined set of symbols. It will be appreciated that more than one selected symbol may be selected from the set of symbols. The selected symbol may be used to match against drawn symbols during play of a game. It will be appreciated that the predefined set of symbols and the selected symbols may be playing card suits, colors, shapes, fruits, etc.

In 430, a customer may choose selected numbers from a pool of numbers. The amount of selected numbers chosen is equal to the spot number selected in step 415. A customer may choose any number from a pool of numbers in any order. The selected numbers chosen may be used in the play of either or both a symbol matching game and a number matching game.

In 440, a customer may select the number of games that the ticket can be played for. For example, if a customer wishes to play the same selected numbers and lucky suit(s) for three games a customer may indicate so. A game may be each time information is drawn that allows a customer to determine whether a chance is a winning chance. A ticket may be a winning ticket if any of the chances on the ticket is a winning chance.

In 445, a customer receives a ticket. The ticket may contain indications of the information selected in 410 to 440. The ticket represents at least one chance in a game. The information selected in 410 to 440 may be processed into a ticket by an operator of a ticket device or the process may be automated. If the process is automated the information may be entered by the customer into a ticket machine that processes the information and generates a ticket.

In 450, a customer may view a display. Initially, the information on the display may include the pool of numbers from which the selected numbers were selected in step 430. At the drawing time, a set of drawn numbers may be shown or highlighted. Different approaches may be employed to display or highlight the drawn numbers, e.g., each drawn number may be shown one at a time, the numbers that are not drawn may be deleted one at a time leaving only a set of drawn numbers. Additionally, the display may be configured to display a corresponding drawn symbol for each number from the pool of numbers. The drawn symbols may be depicted as corresponding with a number from the pool of numbers in a variety of ways, e.g., the drawn symbols can be displayed over or behind a number, all the numbers associated with a drawn symbols may be highlighted one at a time, etc.

In 455, a customer may compare the information on the ticket with information the information on the display. A customer may compare the selected symbol, chosen in step 425, against a drawn symbol for each selected number represented on the ticket. If a customer has elected to play Keno in addition to the symbol matching game, the customer may compare the selected numbers to the set of drawn numbers. Drawn numbers are a subset of the pool of numbers displayed that are drawn for a number matching game.

In 460, a customer determines if a ticket is a winning ticket. Each time a selected symbol suit is the same as a drawn symbol for a selected number represented on the ticket it is a match. Based on the number of selected symbols matched the customer may determine whether a ticket is a winning ticket. A customer may have a second chance at determining whether a ticket is a winning based on a matching of the selected numbers with the drawn numbers, as in a Keno game.

In 470, a customer presents a ticket for redemption, e.g., by presenting it to the cashier or placing it in a ticket validator. The gaming procedure may require tickets to be redeemed at the same establishment where they are sold, or may allow a ticket to be redeemed at a future time and at various locations. The ticket may be authenticated to determine whether the ticket is actually a valid winning ticket, e.g., if the ticket is a winning ticket and has not previously been redeemed. The authentication may be done by use of an authentication code that uniquely identifies the ticket. Conventional schemes for authenticating ticket numbers may be employed, e.g., the authentication number may be used as part of a public key encryption system. The authentication may be done by first ensuring that the ticket is a winning ticket.

In 480, if the ticket is valid winning ticket, a customer may receive a prize for the winning ticket. The prize may be cash, or may be other thing of value, e.g., additional tickets. The prize may vary based on the number of selected symbols matched, the quantity of the spot number, the rules of the game, etc.

Second Example Procedure for Playing a Game of Chance

Figure 5:
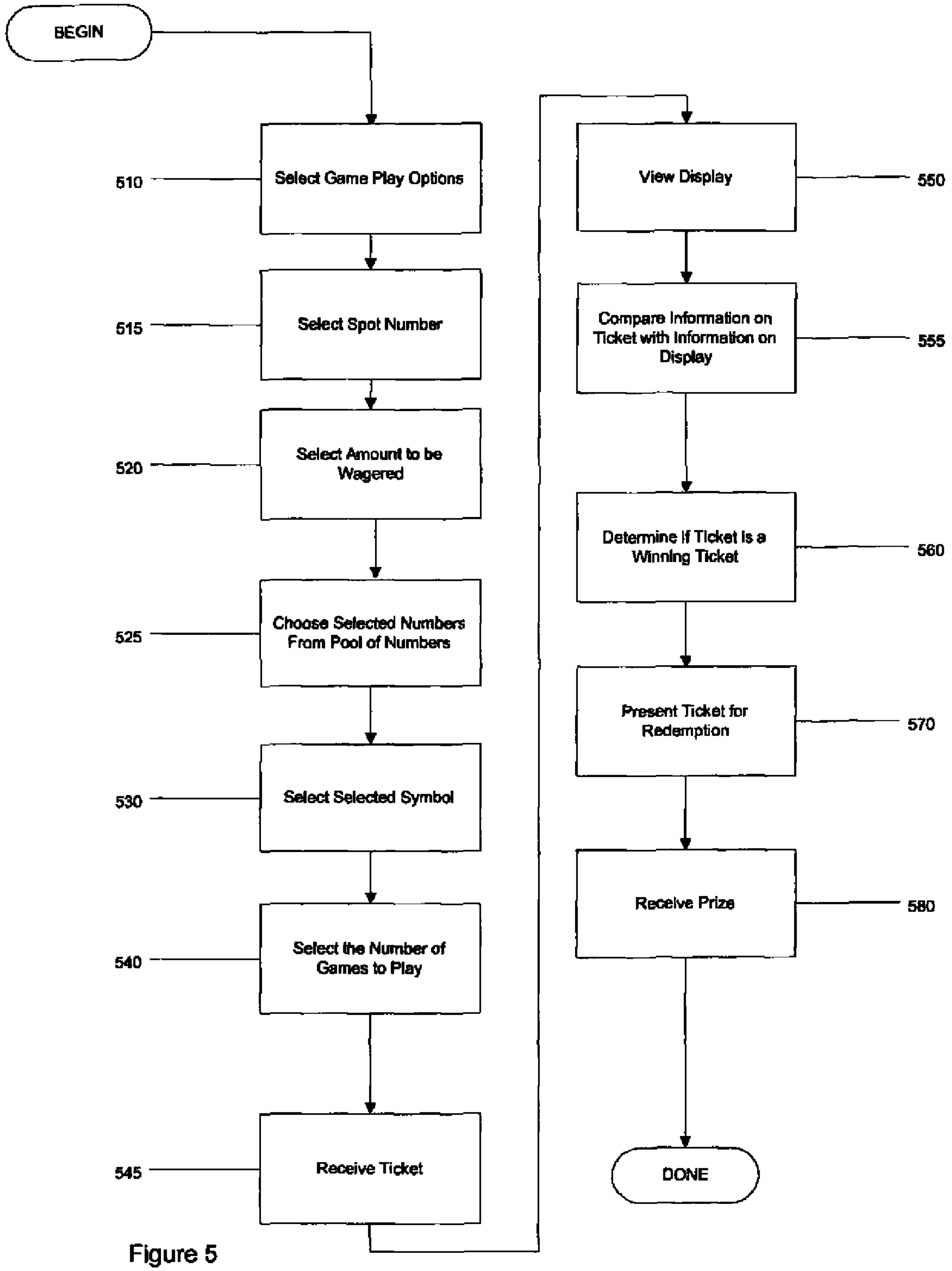
FIG. 5 illustrates a second example procedure for playing a game of chance, according to an example embodiment of the present invention.

FIG. 5 illustrates a second example procedure for playing a game of chance, according to an example embodiment of the present invention. In 510, a customer selects a game play option. A game play option may be selected by marking an entry form, entering information on a machine or computer, or telling a clerk who may enters information for a customer. Game play options may include a game based upon the matching of symbols, a game based on the matching of numbers or both. It will be appreciated that other games may also be included in the game play options. This example procedure details the play of a game of chance based upon the matching of symbols. For the rest of the procedure it will be assumed that a customer has selected to play the game based upon the matching of symbols. If a customer selects only the number matching game the procedure for playing the game may be like Keno.

In 515, the customer may select the spot number (the amount of selected numbers that are to be chosen). For example, if a customer selects the quantity 4 as the spot number then the customer may choose 4 selected numbers. It will be appreciated that the quantity that may a the spot numbers may vary depending on, inter alia, the rules of the game In 520, a customer may select the amount to be wagered. In this step a customer may get to select the dollar amount that is to be risked for each chance in a game. A chance represents a single chance to win. If a customer selects two separate game play options, such as the symbols matching game and the number matching game, then for each game played the customer would have two separate chances at winning. A customer may have the option of selecting different dollar amount to be wagered for each game play option. For example, if a customer selects a symbol matching game and a number matching game as game play options then the customer may have the option of selecting a different amount to be wagered for the symbol matching game and the number matching game.

In 525, a customer may choose selected numbers from a pool of numbers. The amount of selected numbers chosen is equal to the spot number selected in step 515. A customer may choose any number from a pool of numbers in any order. The selected numbers chosen may be used in the play of either or both a symbol matching game and a number matching game.

In 530, a customer may choose a selected symbol from a predefined set of symbols for each selected number chosen. The selected symbol may be used to match against drawn symbols during play of a game. It will be appreciated that the predefined set of symbols and the selected symbols may be playing card suits, colors, shapes, fruits, etc.

In 540, a customer may select the number of games that the ticket can be played for. For example, if a customer wishes to play the same selected numbers and lucky suit(s) for three games a customer may indicate so. A game may be each time information is drawn that allows a customer to determine whether a chance is a winning chance. A ticket may be a winning ticket if any of the chances on the ticket is a winning chance.

In 545, a customer receives a ticket. The ticket may contain indications of the information selected in 510 to 540. The ticket represents at least one chance in a game. The information selected in 510 to 540 may be processed into a ticket by an operator of a ticket device or the process may be automated. If the process is automated the information may be entered by the customer into a ticket machine that processes the information and generates a ticket.

In 550, a customer may view a display. Initially, the information on the display may include the pool of numbers from which the selected numbers were chosen in 530. At the drawing time, a set of drawn numbers may be shown or highlighted. Different approaches may be employed to display or highlight the drawn numbers, e.g., each drawn number may be shown one at a time, the numbers that are not drawn may be deleted one at a time leaving only a set of drawn numbers. Additionally, the display may be configured to display a corresponding drawn symbol for each number from the pool of numbers. The drawn symbols may be depicted as corresponding with a number from the pool of numbers in a variety of ways, e.g., the drawn symbols can be displayed over or behind a number, all the numbers associated with a drawn symbols may be highlighted one at a time, etc.

In 555, a customer may compare the information on the ticket with the information on a display. A customer may compare the selected symbol for each selected number, chosen in 535, with a drawn symbol corresponding to the selected number. If a customer has elected to play Keno in addition to the symbol matching game, the customer may compare the selected numbers to a set of drawn numbers. Drawn numbers are a subset of the pool of numbers displayed that are drawn for a Keno game.

In 560, a customer may determine if a ticket is a winning ticket. Each time a selected symbol for a selected number is the same as a drawn symbol for that number it is a match. Based on the number of symbols matched the customer may determine whether a ticket is a winning ticket. A customer may have a second chance at determining whether a ticket is a winning based on a matching of the selected numbers with the drawn numbers, as in a Keno game.

In 570, a customer presents a ticket for redemption, e.g., by presenting it to the cashier or placing it in a ticket validator. The gaming procedure may require tickets to be redeemed at the same establishment where they are sold, or may allow ticket to be redeemed at a future time and at various locations. The ticket may be authenticated to determine whether the ticket is actually a valid winning ticket, e.g., if the ticket is a winning ticket and has not previously been redeemed. The authentication may be done by use of an authentication code that uniquely identifies the ticket. Conventional schemes for authenticating ticket numbers may be employed, e.g., the authentication number may be used as part of a public key encryption system. The authentication may be done by first ensuring that the ticket is a winning ticket.

In 580, if the ticket is valid winning ticket, a customer may receive a prize for the winning ticket. The prize may be cash, or may be other thing of value, e.g., additional tickets. The prize may vary based on the number of selected symbols matched, the quantity of the spot number, the rules of the game, etc.

Example Procedure for Facilitating the Play of a Game of Chance

Figure 6:
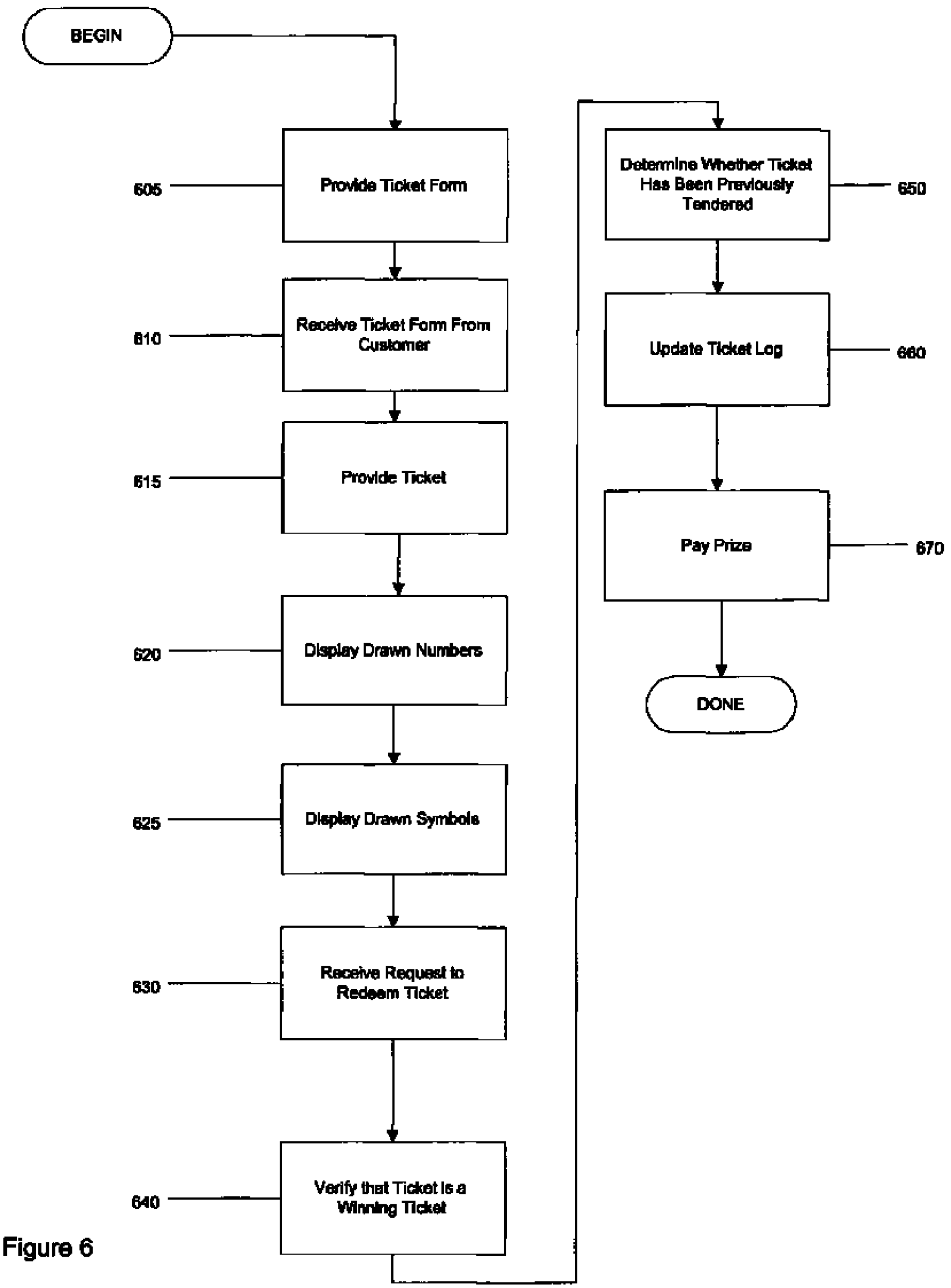
FIG. 6 illustrates an example procedure for facilitating the play of a game of chance, according to an example embodiment of the present invention.

FIG. 6 illustrates an example procedure for facilitating the play of a game of chance, according to an example embodiment of the present invention. In 605, play options may be provided, e.g. by providing an entry form to a game customer, or by providing an on-line form on a selection machine or other display terminal. The play options may be provided upon request. It will be appreciated that a customer may use an entry form to select information for the play of the game.

In 610, play options may be received from a customer. The play options received may contain all the information that a customer wishes to be placed on a ticket. The play options may be received by a cashier or by an automated ticket point of sale system.

In 615, a ticket is provided to a customer. The ticket may be provided by a cashier or attendant, or with an automated ticket point of sale system. It will be appreciated that a customer may be anyone who receives a ticket. It will be appreciated that the entry form may be used to generate the ticket.

In 620, game play information may be displayed on a display terminal. The drawn numbers maybe a subset of the pool numbers used for a number matching game. Different approaches may be employed to display or highlight the drawn numbers, e.g., each drawn number may be shown one at a time, the numbers that are not drawn may be deleted one at a time leaving only the set of drawn numbers.

Figure 7:
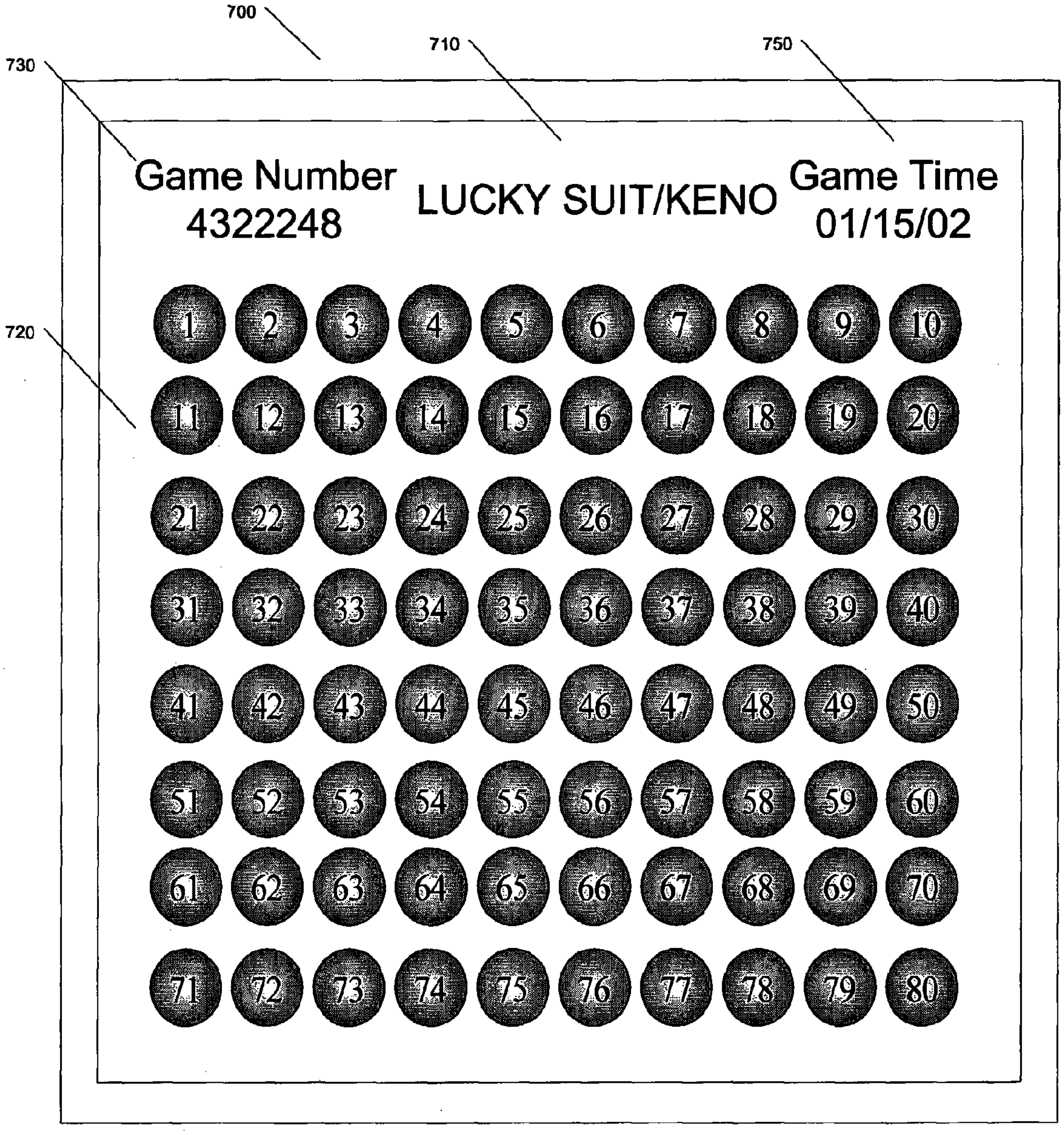
FIG. 7 illustrates an example display screen, according to an example embodiment of the present invention.
Figure 8:
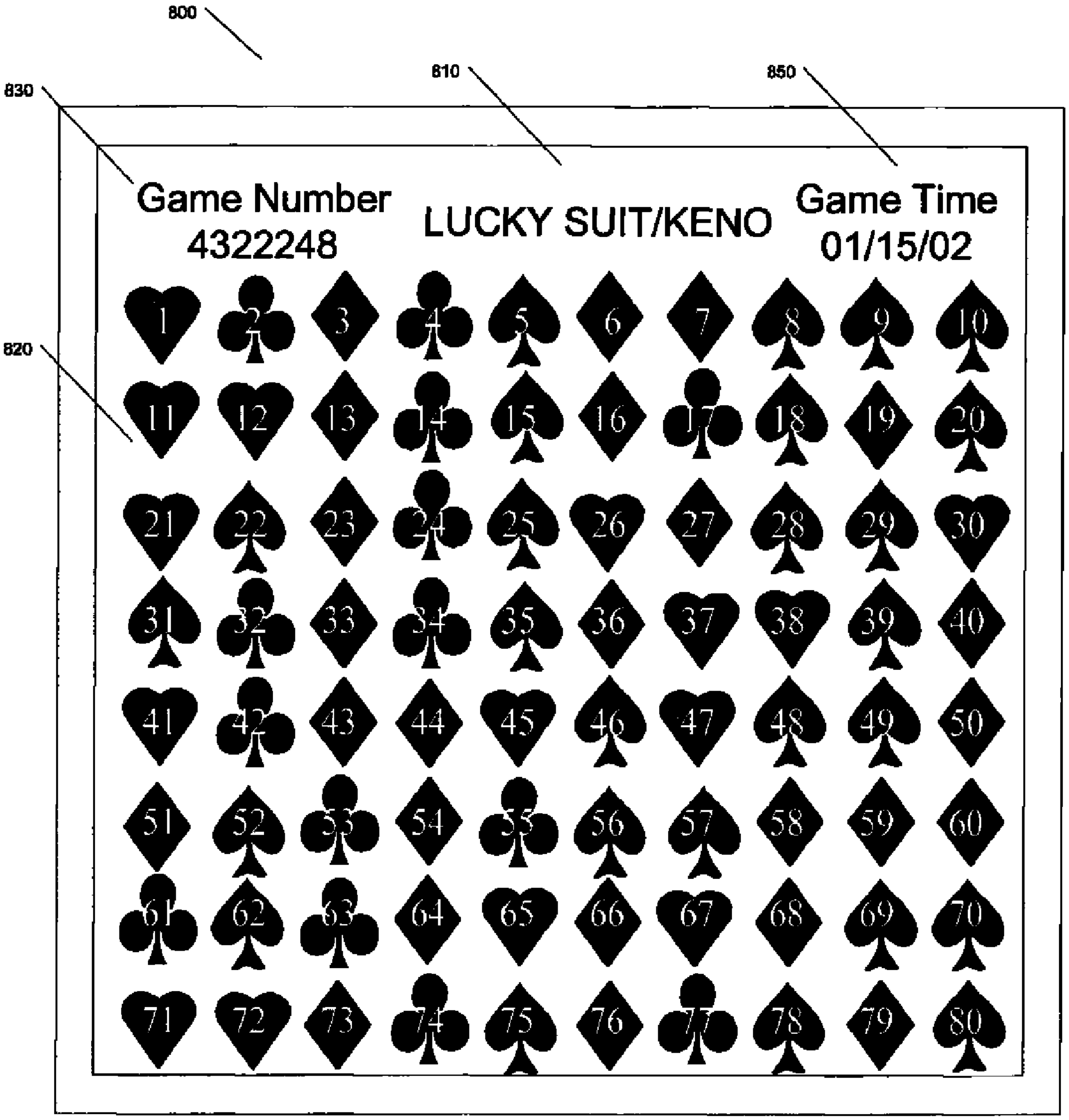
FIG. 8 illustrates a second example display screen, according to an example embodiment of the present invention.

In 625, drawn symbols may be displayed. The drawn symbols may be viewed by a customer and enable a customer to determine whether a ticket is a winning ticket, as explained above. Example display screens are shown in FIGS. 7 and 8. The display may be configured to display a corresponding drawn symbol for each number from the pool of numbers. The drawn symbols may be depicted as corresponding with a number from the pool of numbers in a variety of ways, e.g., the drawn symbols can be displayed over or behind a number, all the numbers associated with a drawn symbols may be highlighted one at a time, etc.

In 630, a request to redeem a ticket may be received. The ticket may be tendered, e.g., by turning it in to a cashier or attendant, or with an automated point of sale system by inserting it into an automatic reader.

In 640, whether a ticket is a winning ticket may be verified. This information may be determined by looking up the authentication code or other information uniquely identifying the ticket in a ticket log that includes information regarding previous sold tickets.

In 650, whether the tendered ticket has been previously tendered may be determined. This may be determined, for example, by examining a field in a ticket log to verify that the tendered ticket has not been previously redeemed. In the event that the ticket log indicates that a ticket has been previously redeemed a message may be sent to the operator indicating that the ticket has been redeemed.

In 660, a ticket log may be updated to reflect the fact that the tendered ticket has been tendered for redemption. Updating the ticket log to reflect that a ticket has been tendered for redemption may prevent the same ticket from being redeemed a second time at a later date.

In 670, an indication may be provided that the cashier should redeem the tendered ticket, e.g., by displaying a prompt on a redemption system display. The amount to be paid may be displayed to the cashier, and/or directly to the person redeeming the ticket. It will be appreciated that this amount may be printed on a customer receipt. This indication may indicate both that the ticket should be redeemed and the amount for redemption. Alternatively, in an automated system, the ticket authentication procedure may initiate a ticket payment procedure automatically, once the ticket has been validated. The information regarding the ticket information may be read from a ticket log.

It will be appreciated that other actions may be included in the example procedure for authentication and payment. For example, electronic payment may require different procedures. Extra security measures may be provided for large prizes, or old tickets, or tickets that were sold at different establishments than the one redeeming the ticket.

Example Display Terminal Screen

FIG. 7 depicts an example display terminal screens according to an example embodiment of the present invention. The display terminal screen 700 may be configured to display information for the play of a game. It will be appreciated that the display terminal hardware may be the same type of display terminal currently used in the Keno lottery games, e.g. television.

The display terminal screen 700 may be configured to display the name of the game 710. Additionally, other information may be displayed such as the rules of the game, advertisements, etc.

The display terminal screen 700 may be configured to display a pool of numbers 720. This display screen may be a display screen used for a game of Keno.

The display terminal screen 700 may be configured to display a game number 730. The game number may indicate the number of the game about to be played. For example in FIG. 7, the game number is 4322248.

The display terminal screen 700 may be configured to display a game time field 750. The game time field may indicate the date or time of the present game. Additionally, the game time field 750 may indicate the time remaining until the next game is to be played.

It will be appreciated that the display terminal screen 700 may be configured to display additional information. For instance, information regarding the previous game, the number of winners of the previous game or advertising information may be displayed. It will be appreciated that one skilled in the art would know how to configure a display terminal to display a set of draw numbers for the playing of a Keno game.

Example Display Terminal Screen

FIG. 8 depicts a second example display terminal screens according to an example embodiment of the present invention. The display terminal screen 800 may be configured to display information for the play of a game. It will be appreciated that the display terminal hardware may be the same type of display terminal currently used in the Keno lottery games, e.g. television.

The display terminal screen 800 may be configured to display the name of the game 810. Additionally, other information may be displayed such as the rules of the game, advertisements, etc.

The display terminal screen 800 may be configured to display a pool of numbers 820. For each number displayed a corresponding drawn symbol is displayed with it. The corresponding drawn symbol may be used for the symbol matching game described above. Additionally, the display numbers may be used in a numbers matching game such as Keno. The drawn symbol may be randomly selected for each number.

The display terminal screen 800 may be configured to display a game number 830. The game number may indicate the number of the game about to be played. For example in FIG. 8, the game number is 4322248.

The display terminal screen 800 may be configured to display a game time field 850. The game time field may indicate the date or time of the present game. Additionally, the game time field 850 may indicate the time remaining until the next game is to be played.

It will be appreciated that the display terminal screen 800 may be configured to display additional information. For instance, information regarding the previous game, the number of winners of the previous game or advertising information may be displayed. It will be appreciated that one skilled in the art would know how to configure a display terminal to display a set of draw numbers for the playing of a Keno game.

Example Chart of Matching Values

FIG. 9 illustrates an example chart 900 for determining whether a chance is a winning chance and if so the amount that may be won by the chance. This example chart may be printed on a ticket or made available to customers who purchase tickets. To determine whether a chance is a winning chance and if so the amount that may be won a ticket holder must know the spot number (the number of numbers on the ticket) and the number of playing card suits matched. The example chart is for a $1 chance. Similar charts could be made for each amount of chance.

Spot column 910 lists the various spot numbers that may be selected for playing a game of chance. As described earlier, the spot numbers may vary depending on the rules of the game.

Match column 920 lists the number of matches made. The method of determining symbol matches between a ticket and a display is described above. In order to determine the value of a winning ticket a customer must know the spot number and the match number. Where these two columns intersect is listed the value of the prize that may be received. If no number is listed in the intersection of the two columns then the chance may not be a winning chance.

Example Ticket Log

FIG. 10 illustrates an example ticket log, according to an example embodiment of the present invention. The example ticket log 1000 may be used to keep track of tickets that have been sold, as well as whether sold tickets have been redeemed. The example ticket log may include a plurality of entries 1010, each entry corresponding to a ticket that has been sold. It will be appreciated that the ticket log, although illustrated as a table, may be stored in a variety of conventional data structures, e.g., as a linked list, or a custom-designed object. It will also be appreciated that the ticket log information may be incorporated in other data structures, rather than as a separate log, e.g., if the prize pool were stored in a relational database, the information may be stored in the prize pool may be split in multiple tables in a way that allows the information to be accessed as a log using conventional database queries.

FIG. 10*b* illustrates an example entry 1010 from the example ticket log, according to an example embodiment of the present invention. The example entry 1010 may include a plurality of fields that provide information about a particular ticket that has been sold. The example entry 1010 may include a ticket number 1060 that uniquely identifies a ticket that has been sold. This ticket number 1060 may be an authentication code.

The example entry 1010 may include a game field 1050 that indicates the game or games that the ticket is for.

The example entry 1010 may include a time field 1040 that may indicate the time the corresponding ticket was sold.

The example entry 1010 may include a prize field 1030, which may indicate the amount that will be paid upon the tickets redemption. This amount may be calculated based on the ticket information and the display information. In the event that a ticket is for multiple chances in a single game or multiple games then the prize field 1030 may represent the total amount won by a ticket (the total amount won by each chance in each game).

The example entry may include a redemption field 1020 that may indicate whether the ticket has been redeemed, and if it has when the redemption occurred. It will be appreciated that the ticket log entry may include other fields not shown, e.g., an indication where or by whom the ticket was sold or redeemed, the value of the authentication code for the ticket, price information for the ticket, an indication of the symbols to be displayed for that game.

Example Lottery Terminal System

Figure 11:
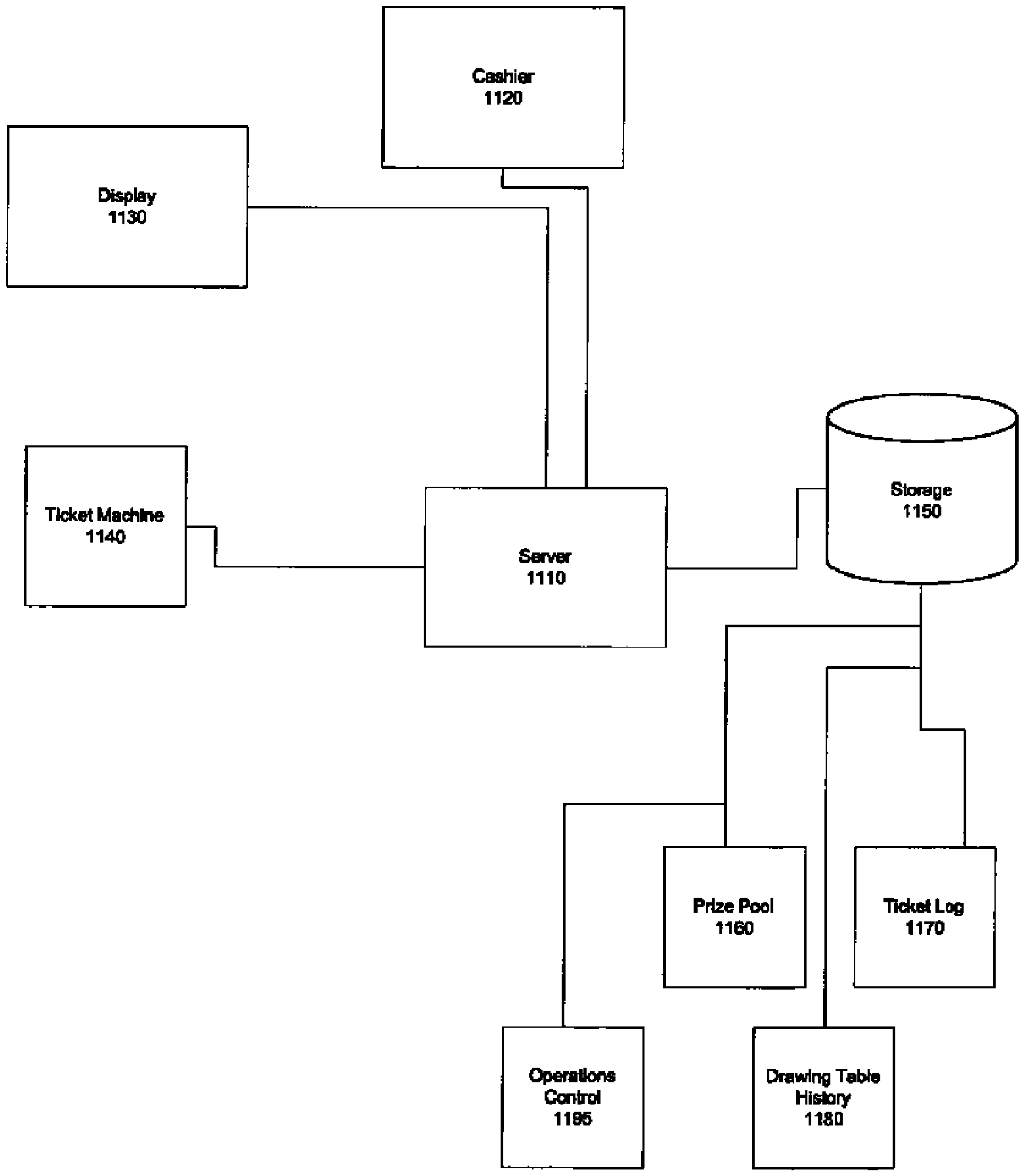
FIG. 11 illustrates an example lottery system for use in facilitating the play of a game of chance, according to an example embodiment of the present invention.

FIG. 11 illustrates an example lottery terminal system according to an example embodiment of the present invention. FIG. 11 illustrates a logical view of an example lottery terminal system, according to an example embodiment of the present invention. The example lottery terminal system may include one or more ticket machines 1110, one or more cashier machines 1120, and one or more or display devices or monitors 1130.

The example lottery terminal system may include a server 1140. The server may include a conventional microprocessor or custom designed control circuitry. The server may be in communication with the ticket machine 1110, cashier machine 1120, and display device 1130. The server 1140 may be used to control the operation of the other components of the lottery terminal system, e.g., by executing a control program that facilitates the play of a game of chance. The server may be configured to control the lottery terminal system in carrying out procedures for facilitating the play of a lottery game, generating drawn numbers, generating drawn symbols, and authenticating and paying winning lottery tickets, as were described above.

The example lottery terminal system may include a storage subsystem 1150. The storage subsystem may include RAM, ROM, disk, optical disk, flash memory, or other conventional storage media. The storage subsystem may be a separate component from the server 1140, or may be included as part of the server 1140.

Stored in the storage subsystem 1150 may be programs and data used to control or facilitate the play of lottery games. A game control program 1170 may be used to control the sale and redemption of gaming chances in the procedures for playing and facilitating the play of a lottery game that were described previously. The storage subsystem may also include a ticket log 1190, that may be used to record the sale of tickets and facilitate procedures for redeeming tickets. The storage subsystem may further include a drawing table history 1195, that may be used to record drawing information for all drawings that have occurred, e.g., record drawn symbols and drawn numbers for each previous game.

It will be appreciated that the programs, prize pool, and ticket log need not be located in a particular storage subsystem, e.g., they could reside directly on the server. It will also be appreciated that other elements may be included in the example lottery terminal system, e.g. operations control program, security, auditing capabilities, etc.

Modifications

In the preceding specification, the present invention has been described with reference to specific example embodiments thereof. It will, however, be evident that various modifications and changes may be made thereunto without departing from the broader spirit and scope of the present invention as set forth in the claims that follow. The specification and drawings are accordingly to be regarded in an illustrative rather than restrictive sense.

The invention claimed is:

1. A computer implemented method of facilitating a game of chance, comprising:

receiving a wager in the game of chance at a terminal;

as part of receiving the wager, receiving information indicating a set of player-selected numbers from a pool of numbers;

as part of receiving the wager, receiving information indicating a player-selected symbol;

after receiving the wager, generating a set of drawn numbers from said pool of numbers;

after receiving the wager, generating a set of drawn symbols with a computer, at least one symbol being drawn for each number in the pool of numbers;

after receiving the wager, displaying on a video display the set of drawn symbols and the set of drawn numbers;

responsive to the player-selected numbers matching at least a first predetermined quantity of the drawn numbers, awarding a first prize;

and responsive to the player-selected symbol matching at least a second predetermined quantity of the drawn symbols corresponding to the player-selected numbers, awarding a second prize.

2. The method of claim 1, further comprising:

printing a ticket including said set of player-selected numbers and said player-selected symbol.

3. The method of claim 2, wherein the ticket contains an authentication code, the method further comprising:

receiving a tender of the ticket for at least one of the first prize or the second prize; and responsive to a validation of the authentication code, paying at least one of the first prize or the second prize.

4. The method of claim 2, wherein the amount of the second prize is a function of the quantity of symbols in the set of drawn symbols corresponding to said player selected numbers that are matched by said player-selected symbol.

5. The method of chance of claim 2, wherein the amount of the first prize is a function of the quantity of said player-selected numbers matched with said drawn numbers.

6. The method of claim 1, further comprising:

receiving information indicating a second player-selected symbol;

and responsive to said second player-selected symbol matching at least a third predetermined quantity of symbols in the set of drawn symbols for each of said player-selected numbers, awarding a third prize.

7. The method of claim 1, wherein the first prize is received if said player-selected symbol matches exactly the predetermined quantity of symbols in the set of drawn symbols corresponding to the player-selected numbers.

8. The method of claim 1, wherein the second predetermined quantity is at least two.

9. The method of claim 1, wherein the second predetermined quantity is more than five.

10. A computer-implemented method of facilitating a game of chance, comprising:

receiving a wager in the game of chance;

as part of receiving the wager, receiving information indicating a set of player-selected numbers from a pool of numbers;

as part of receiving the wager, receiving information indicating a player-selected symbol for each selected number;

after receiving the wager, generating a set of drawn numbers;

after receiving the wager, generating, with a computer, a set of drawn symbols including a separate symbol for each number in the pool of numbers, displaying on a video display the set of drawn numbers and the set of drawn symbols;

awarding a first prize if a first predetermined quantity of the selected symbols matches the drawn symbols corresponding to the same selected numbers.

11. The method of claim 10, further comprising:

awarding a second prize conditioned on said selected numbers matching a second predetermined quantity of the set of drawn numbers.

12. The method of claim 11, wherein the amount of the second prize is a function of the quantity of said selected numbers matched with said drawn numbers.

13. The method of claim 10, further comprising:

providing a ticket including the set of selected numbers, the selected symbols for each selected number, and an authentication code;

receiving a tender of the ticket for a prize; and paying the prize if the authentication code is validated.

14. The method of claim 10, wherein the amount of the first prize is a function of the quantity of said selected symbols matched with said drawn symbols corresponding to the same selected numbers.

15. The method of claim 10, wherein the prize is received if exactly the predetermined quantity of player-selected symbols matches the drawn symbol for the same player-selected numbers.

16. The method of claim 10, wherein the first predetermined quantity is at least two.

17. The method of claim 10, wherein the first predetermined quantity is more than five.

18. A system for facilitating the play of a game of chance, comprising:

a display terminal configured to display a set of drawn symbols corresponding to each of the numbers in a pool of numbers and a set of drawn numbers chosen from the pool of numbers;

a ticket machine generating tickets having a player-selected symbol and a set of player-selected numbers chosen from the pool of numbers;

a storage device storing information regarding the tickets generated by the ticket machine;

an operations controller generating the set of drawn symbols and the set of drawn numbers; and a ticket redemption device in communication with the operations controller, the ticket redemption device receiving a ticket tendered for a prize and paying the prize for a tendered ticket if the player-selected symbol matches a predetermined quantity of the drawn symbols corresponding to the set of player-selected numbers.

19. The system of claim 18, wherein the predetermined quantity is at least two.

20. The system of claim 18, wherein the predetermined quantity is more than five.

* * * * *